United States Patent [19]
Chen et al.

[11] Patent Number: 5,236,205
[45] Date of Patent: Aug. 17, 1993

[54] MOLDED THERMOPLASTIC RESIN GASKET HAVING A COMPOUND SEALING BEAD

[75] Inventors: Colin Chen, Barrinton; Robert H. Morris, Downers Grove, both of Ill.

[73] Assignee: Fel-Pro Incorporated, Skokie, Ill.

[21] Appl. No.: 918,880

[22] Filed: Jul. 23, 1992

Related U.S. Application Data

[63] Continuation of Ser. No. 716,060, Jun. 17, 1991, abandoned.

[51] Int. Cl.$^5$ ............................................. F16J 15/32
[52] U.S. Cl. ............................... 277/235 B; 277/211; 277/207 R; 277/227
[58] Field of Search ............... 277/235 B, 207 R, 209, 277/211, 166, 207 A, 227, 213, 210, 235 A

[56] References Cited

U.S. PATENT DOCUMENTS

| | | | |
|---|---|---|---|
| 2,092,393 | 9/1937 | Hewitt | 277/235 B |
| 2,705,655 | 4/1955 | Brown et al. | 277/211 |
| 3,477,867 | 11/1969 | Hillier | 277/235 B X |
| 4,535,996 | 8/1985 | Cardis et al. | 277/235 B |
| 4,677,014 | 6/1987 | Bechen | 277/235 B |
| 4,743,421 | 5/1988 | McDowell et al. | 277/235 B |
| 4,817,969 | 4/1989 | McDowell et al. | 277/235 B |

FOREIGN PATENT DOCUMENTS

| | | | |
|---|---|---|---|
| 0473101 | 4/1951 | Canada | 277/235 B |
| 358855 | 3/1990 | European Pat. Off. | 277/235 B |
| 2831217 | 1/1980 | Fed. Rep. of Germany | 277/235 B |
| 1445440 | 5/1966 | France | 277/235 B |
| 2306385 | 10/1976 | France | 277/207 R |

*Primary Examiner*—William A. Cuchlinski, Jr.
*Assistant Examiner*—Daniel G. DePumpo
*Attorney, Agent, or Firm*—Dressler, Goldsmith, Shore, Sutker & Milnamow, Ltd.

[57] ABSTRACT

A molded thermoplastic resin gasket such as a cylinder head gasket having an integral, non-elastomeric compound, bead over bead, sealing bead projecting outwardly from the gasket body and surrounding at least one service opening.

12 Claims, 2 Drawing Sheets

MOLDED THERMOPLASTIC RESIN GASKET HAVING A COMPOUND SEALING BEAD

This application is a continuation of application Ser. No. 07/716,060, filed Jun. 17, 1991 now abandoned.

BACKGROUND OF THE INVENTION

The present invention relates to gaskets and especially to high temperature gaskets such as head gaskets to be used in sealing the head and block of an internal combustion engine, as well as to other gaskets used in association with such engines, particularly where high service temperatures are encountered. Gaskets used in environments where high service temperatures are encountered, as in air compressors, may also be produced in accordance with this invention.

The sealing of an internal combustion engine is a complex and difficult matter. High temperatures and pressures which are localized and which vary across the surface of the gasket between the block and the head require differing treatments at different areas, and usually require the use of sealing aids such as grommets, elastomeric seals, armoring and the like. High temperature engineering resins and composites have been suggested for use for head gaskets, for example in U.S. Pat. No. 4,817,969.

In U.S. Pat. No. 4,817,969 a sealing bead which is integrally formed with the gasket body is provided. The bead is preferably trapezoidal in cross-section and extends above the surface of the main body a distance of from about at least 5% to about 15% of the thickness of the main body. Desirably a pair of recesses are provided in the main body at the base of and immediately adjacent to the sealing bead. The recesses accommodate some flow of the resin forming the bead under high sealing loads to reduce the possibility of stress-cracking of the sealing beads.

It has been determined, especially for high temperature engineering plastics, that it is desirable that the bead be relatively narrow. That will enable the bead to be more conformable to mating surfaces. However as temperatures rise, as in the use of a head gasket, a narrow bead has less strength, and as a result maintaining a seal becomes more difficult. If a wider bead is used, at higher temperatures such a bead will eliminate creep relaxation. However a wide bead tends to be too stiff to allow proper sealing of the joint at room temperature. As such, delicate and careful balances are required, making effective sealing more difficult to accomplish than is desirable. Finally, although use of the recesses tends to reduce the difficulties in effecting a seal via a wide bead at room temperatures, it also sometimes allows too much creep relaxation at elevated temperatures.

Accordingly, it would be desirable to provide an engineering plastic gasket, such as a head gasket, having an integral sealing bead of improved sealing capacity at both low and high operating temperatures, and which is installed without requiring excessively high clamping loads.

SUMMARY OF THE INVENTION

The invention of the present invention comprises a non-asbestos gasket and in particular comprises a gasket fabricated of a thermoplastic material, and especially of a fiber reinforced thermoplastic composite gasketing material which is formed to provide specially configured sealing beads which directly seal automotive engine openings, such as oil and coolant ports, without the need for auxiliary or added sealing aids thereat. Under compressive loads, the integrally formed sealing beads themselves maintain an effective seal and avoid stress relaxation sufficiently to avoid losing an effective seal.

In accordance with the present invention an improved gasket is provided. In a preferred form the gasket is a cylinder head gasket for an internal combustion engine having a head, a block, at least one combustion chamber and at least one passage for fluid communication between the head and the block. The gasket comprises a thin main gasket body having expansive main surfaces defining a plurality of openings including at least one service opening. The gasket body is molded of a thermoplastic resin material, such as a reinforced thermoplastic resin composite, the resin being filled and reinforced with fibers in an amount of at least 3% by weight of the unfilled resin. The gasket body as molded has an integrally formed compound sealing bead projecting outwardly from at least one main surface of the gasket body and surrounding at least one service opening. The compound sealing bead comprises a first bead element formed with the gasket body which extends outwardly from a main surface of the gasket body, and which has a first cross-sectional width where it merges with its main surface, and a second bead element having its base integral with the first bead element. The second bead element extends outwardly from the first bead element, has a second cross-sectional width where it merges with the first bead element, and its width is substantially less than the first cross-sectional width. There is no recess in the main surface adjacent the first bead element.

In a preferred form the first cross-sectional width is at least twice the second cross-sectional width and the bead elements are trapezoidal in cross-section.

In a most preferred form the gasket is a head gasket having at least two combustion openings and armors disposed at the peripheries of the combustion openings.

Further objects, features, and advantages of the invention will become apparent from the following description and drawings.

DESCRIPTION OF THE PREFERRED EMBODIMENTS

Figure 1:
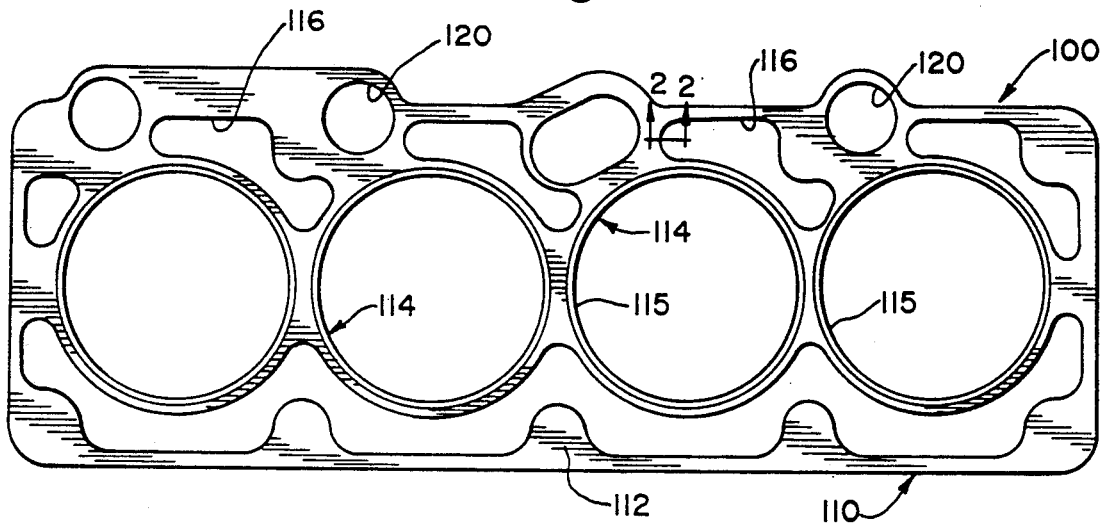
FIG. 1 is a plan view of an automotive head gasket formed in accordance with the present invention.

The preferred gasket of the present invention is a cylinder head gasket (as illustrated by FIG. 1) for an engine having a head, a block, at least one combustion cylinder and plural openings for fluid communication between the head and the block. The gasket 100 desirably comprises an integrally formed, thin main gasket body 110 having expansive main surfaces 112 defining a plurality of openings including at least two combustion openings 114 with armor 115 such as the armor illustrated in U.S. Pat. No. 4,817,969 and plural service openings 116 for fluid communication between the head and the block of the internal combustion engine, as well as bolt holes 120. The main gasket body is integrally formed, as by injection molding, of a thermoplastic resin. In a preferred form the thermoplastic resin is a thermoplastic resin composite. Preferably, the thermoplastic resin in an unfilled state has a high heat distortion temperature, preferably of at least about 347° F. at 264 psi (according to ASTM Test D648) and is essentially inert to water and to automotive fuels, coolants and oils.

Like the resins identified in U.S. Pat. No. 4,817,969, those thermoplastic resins which are preferred for use in accordance with the present invention are those which are substantially and primarily amorphous. Amorphous resins are particularly useful for high temperature gasket applications, such as head gaskets. Thus, it is preferred that the resins be isotropic and have the same properties in all directions for several reasons. Among those are the preference that the resin not have a sharp melting point, i.e., that the resin, if it melts or tends to melt at all, should not change significantly at a single given temperature. Thus, if localized heating should occur, i.e., if the gasket should reach the melting point of a crystalline resin, the gasket would fail at that point. With an amorphous resin, or one which is primarily amorphous, the change in state of the resin takes place over a range of temperatures and thus would not necessarily fail at a single temperature point. Another advantage of amorphous resins is that in molding they do not go through a sharp liquid/solid transition (and consequent significant volume changes), as distinguished from the liquid/glass transition of amorphous resins, thus providing closer control (and less shrinkage) over the dimensions of the as-molded gasket.

Preferably the resins used in accordance with the present invention have an "aromatic backbone." By the term "aromatic backbone" is meant that the aromatic group is actually a portion of the main chain of the polymer, as distinguished from being a side ring. The resin has a low flexural modulus of about 250,000 psi and a high ultimate elongation of at least about 25% to provide effective sealing. At present, polyether sulfones which have aromatic backbones and stable ether linkages are preferred. They are resistant to oil, water and fuels such as gasoline and diesel fuel at the operating temperatures and pressures conventionally encountered in typical automotive engines. Another preferred resin is polyphenylene sulfide.

Properties of typical unfilled polyether sulfones are as follows:

TABLE I

| | Low Viscosity | General Grade | Medium Viscosity | High Viscosity |
|---|---|---|---|---|
| Average Molecular Wt. | 14,800 | 17,650 | 22,390 | 26,000 |
| Tensile Strength (psi) | 12–13,000 | 12–13,000 | 12–13,000 | 12–13,000 |
| Flexural Modulus (psi) | 350,000 | 350,000 | 350,000 | 350,000 |
| Elongation at Break (%) | 40–80% | 40–80% | 40–80% | 40–80% |
| Izod Impact Strength Notched (ft. lb./in.) | 1.42 | 1.57 | 2.25 | |
| Heat Distortion Temp. @ (264 psi) | 395° F. | 395° F. | 395° F. | 395° F. |
| Glass Transition Temp. (Tg) | 428° F. | 428° F. | 428° F. | 428° F. |

It appears that the molecular weights of polyether sulfones do not significantly change the physical or functional properties of those resins, such as tensile modulus, flexural modulus, elongation at break, use temperature or heat distortion temperature. However, reinforcing with fibers does significantly and importantly change the overall characteristics of the unfilled resins.

Thus in a preferred form, the resin is filled and reinforced with fibers having a higher stiffness and strength than the unfilled resin. The reinforcing fibers cause a very beneficial distribution of load, between fibers and the resin matrix, to which the gasket is subjected in use. Further, the fibers, having good adhesion and bonding to the resin matrix and having a high elastic modulus and tensile strength, support a larger proportion of the applied load and, consequently, prevent torque loss by reducing the stress relaxation which is characteristic of the unreinforced resin. The surface characteristics of the fibers, whether by an added sizing or otherwise, sufficiently bond or adhere to the resin to serve as a reinforcement and to provide other functions referred to.

The fibers should have an aspect ratio of an average of at least 10 to 15, desirably at least 20 and preferably an aspect ratio in the range of from 50 to 125. The most preferred fiber diameter for glass is about 0.0004 inch. Fibers which are too short will not allow for attaining maximum fiber stress and the fiber may pull out of the fiber-resin bond. For glass fibers with a tensile strength of 250,000 psi, the minimum desirable length is 20 times the diameter, or about 0.008 inch. Preferably and typically the length is at least 100 times the diameter, i.e., at least about 0.04 inch.

The fibrous reinforcement consists of fibers which are high in strength, heat resistance and fatigue resistance. They are typically of low elongation and are low in energy absorption. They are rigid, but are sufficient flexible so that in admixture with the resin they may bend under transverse compression without fracturing. Within their elastic limitations the fibers act to help in maintaining a tight seal and in preventing creep.

Typical properties of a polyether sulfone on a filled versus unfilled basis are as follows:

TABLE II

| | Unfilled | 20% (glass by weight) | 40% (glass by weight) |
|---|---|---|---|
| Tensile Strength (psi) | 12–13,000 | 18,000 | 22,000 |
| Elongation at Break (%) | 40–80 | 3–4 | 3–4 |
| Flexural Modulus (psi) | 350,000 | 850,000 | 1,600,000 |
| Heat Distortion Temp. | 395° F. | 410° F. | 420° F. |

In order that the gasket retains its torque and other properties at elevated temperatures, it is desirable that the fibers have a tensile modulus of not less than about $10 \times 10^6$ at room temperature.

Thus, the fibers should be resistant to tensioning and bending, i.e., should be resistant to deformation. The higher the modulus, the more load the fibers, hence the fiber reinforced resin, will take and the greater the sealing stress retention of the sealing beads will be. Examples of suitable fibers are A-glass, C-glass, E-glass, carbon, graphite, high silica, quartz, and alumina. Typical tensile moduli of suitable fibers include C-glass ($10 \times 10^6$ psi at 260° C.); E-glass ($10.5 \times 10^6$ psi at 260° C.); quartz ($10 \times 10^6$ psi at 260° C.); carbon/graphite (30 to $79\times10^6$ psi at room temperature); alumina ($15\times10^6$ psi at room temperature); aluminum ($10.6\times10^6$ psi at room temperature); and Kevlar 49 ($16\times10^6$ psi at 309° F.).

Fibers act as effective reinforcement when their aspect ratio (ratio of length to diameter, l/d) is governed by the following equation (See Analysis and Performance of Fiber Composites by B. D. Agarwal and L. J. Broutman, John Wiley and Sons, N.Y. 1980.):

$$\frac{1}{d} = \frac{S_{fu}}{2Ty}$$

where $S_{fu}$ is the ultimate tensile strength of the fibers and Ty the yield stress of the matrix. For a typical E-glass in a thermoplastic resin matrix, the aspect ratio of fibers should be at least 100. Generally aspect ratios of a minimum of 20, and preferably in a range of from 50 to 125 are to be preferred, and most preferably a minimum of about 100.

A variety of fibers may be considered for use in admixture with suitable resins. Thus, fibers having apparently suitable ultimate elongation properties of less than 10% at 500° F. include the following: carbon (0.59-2.0% ultimate elongation at 500° F.); S-2 glass (5.4% ultimate elongation at 500° F.); E-glass (4.8% ultimate elongation at 500° F.); S-glass (5.7% ultimate elongation at 500° F.); C-glass (4.8% ultimate elongation at 500° F.); quartz (0.17% ultimate elongation at 500° F.); and stainless steel (1.2-1.5% ultimate elongation at 500° F.). Typical thermoplastic resins have ultimate elongations well in excess of 10%, but when reinforced with fibers are well below ultimate elongations of 10%. Examples are the following: polyether sulfone with 20% by weight glass fiber (3% ultimate elongation); polyether imide with 10% by weight glass fiber (6% ultimate elongation); polyether imide with 20% by weight glass fiber (3% ultimate elongation); polyphenylene sulfide with 30% by weight glass fiber (3 to 4% ultimate elongation); polyether ether ketone with 30% by weight glass fiber (4 to 5% ultimate elongation); polyether ether ketone with 30% by weight carbon fiber (2 to 3% ultimate elongation); and polysulfone with 30% by weight carbon fiber (2 to 3% ultimate elongation).

The fibers used as reinforcement have high stiffness, strength, heat resistance and fatigue resistance. However, they are sufficiently deformable so that in the composite of fibers and resin, they may deform (elongate, contract, or bend) without fracturing under the expected transverse compressive loads. During this elastic deformation they store sufficient energy to maintain a tight seal and to prevent creep and torque loss.

The fibers should be randomly oriented and uniformly distributed in the resin over most of the gasket body to provide the same properties in all directions. However in particular locations preferential fiber orientation may significantly and importantly improve the strength and character of the gasket thereat. It is possible to promote selective preferential fiber orientation during molding, such as during injection molding, by controlling the direction of flow and location of the introduction of the resin fiber mixture into the mold.

For sealing beads to perform their intended sealing functions with thermoplastic resin composites of the types described herein, it was determined that they should protrude above the main surface of the gasket body so that when the gasket is placed in an engine and the bolts are torqued, the beads will deform. Deformation of the beads accomplishes two purposes, namely the deformed areas have high unit area loadings which produce good seals, and they are able to conform to small imperfections in either block or head which might otherwise produce leaks.

In accordance with the present invention, the compound sealing beads 150 are specially configured, and essentially comprise a compound, bead over bead configuration. Compound beads 150 comprise a lower bead element 160 and an upper bead element 170, both of which project outwardly from the main surfaces 112 of the gasket body 110. Bead element 160 may be similar in shape and size, albeit of a somewhat lesser height than the bead described in U.S. Pat. No. 4,817,969. Bead element 170 is considerably narrower than bead element 160, and the first bead element is preferably at least twice the cross-sectional width of the second bead element.

In a preferred embodiment the lower bead element 160 is of trapezoidal shape in cross-section and has a bead width of from about 0.060 inch to about 0.090 inch at its base where it merges into the main surface. The narrower upper bead element, also is generally of trapezoidal shape in cross-section, and has a bead width of about 0.03 inch at its base where it merges into the lower bead element.

Figure 2:
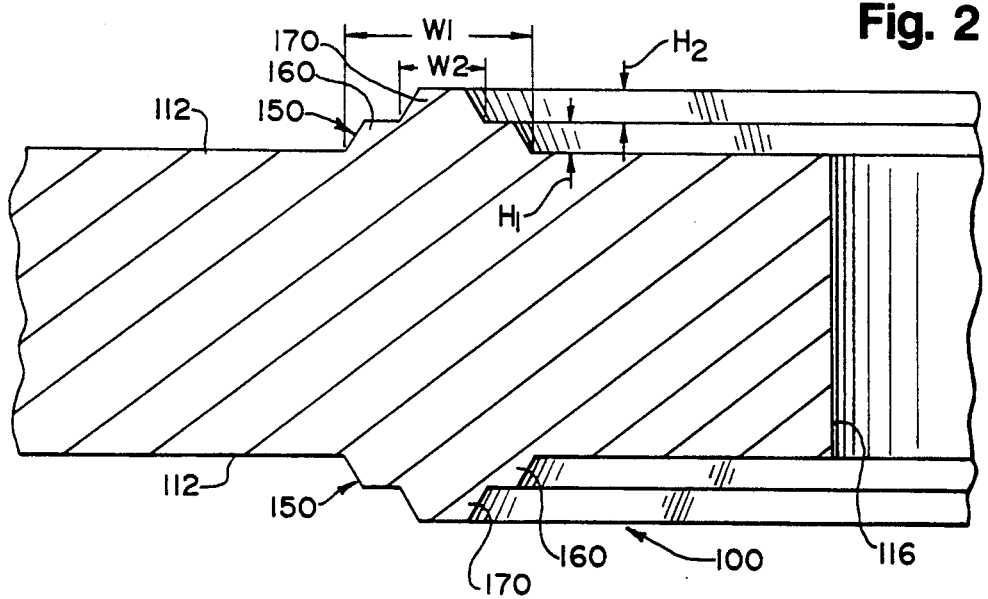
FIG. 2 is an enlarged cross-sectional view of a portion of the gasket of FIG. 1 taken substantially along line 2—2 of FIG. 1.

One compound sealing bead and main gasket surface structure has been made of polyether sulfone (PES) having a glass fiber content of 20%, and generally in accordance with the configuration represented by FIG. 2. Thus, the dimensions W1 and W2 were 0.09 inch and 0.03 inch respectively, and H1 and H2 were 0.002 inch and 0.003 inch, respectively.

Another compound sealing bead and main gasket surface structure has been made of polyphenylene sulfide (PPS) having a glass fiber content of 20%, and generally in accordance with the configuration represented by FIG. 2. Thus, the dimensions W1 and W2 were 0.06 inch and 0.03 inch, respectively, and H1 and H2 were 0.002 and 0.003 inch, respectively.

The compound bead over bead configuration has been found to provide a substantially improved sealing effect, as compared to that of the single bead of the type described in U.S. Pat. No. 4,817,969.

Figure 3:
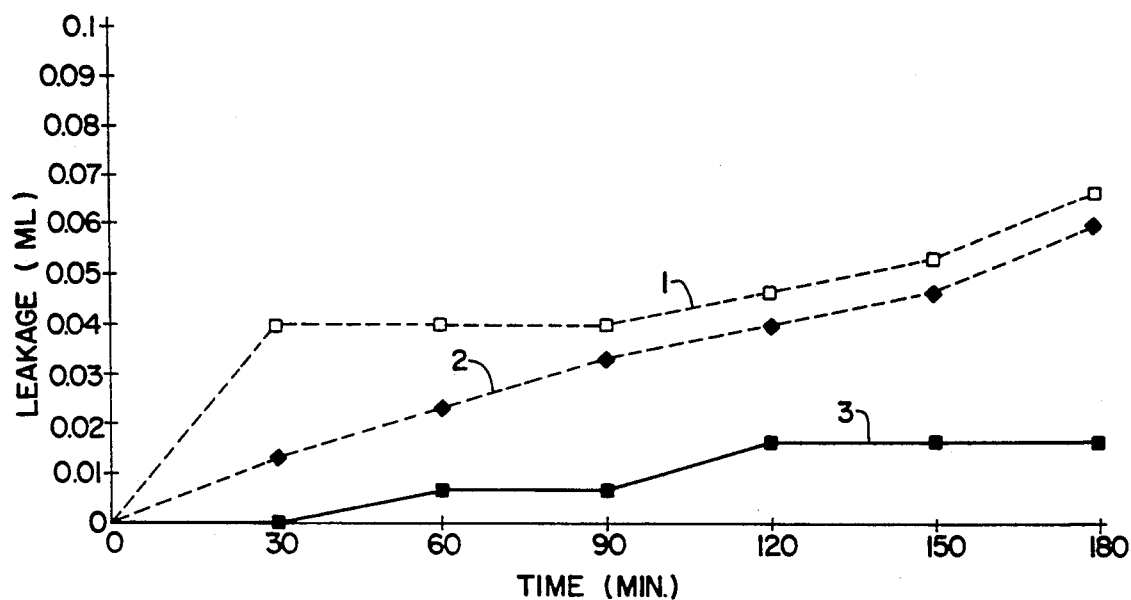
FIG. 3 is a graph comparing the leakage rate characteristics of gaskets of the present invention to those of the prior art.

Referring now to FIG. 3, a comparison of the sealing effects of prior art beads of the type shown in U.S. Pat. No. 4,817,969 and the compound bead of the present invention is provided. First and second curves show leakage rates in milliliters past a conventional polyether sulfone bead having a 0.09 inch bead width and a conventional polyphenylene sulfide bead having a 0.06 inch bead width. The third curve shows a much lower leakage rate for the compound bead configuration of the present invention, namely a bead of polyphenylene sulfide having a base bead element width of 0.06 inch and an upper bead element width of 0.03 inch and heights as described above.

Each of those tests was conducted using a conventional coolant, a clamping load of 2000 psi and 7060 pounds, a fluid pressure of 50 psig and the tests were run for three hours. Three tests were conducted for each of the samples, and the curves in FIG. 3 represent an average of the three tests.

Thus, FIG. 3 shows that the overall leakage rate for the compound bead configuration was substantially lower, hence much improved as compared to the more conventional single beads of the prior art.

Figure 4:
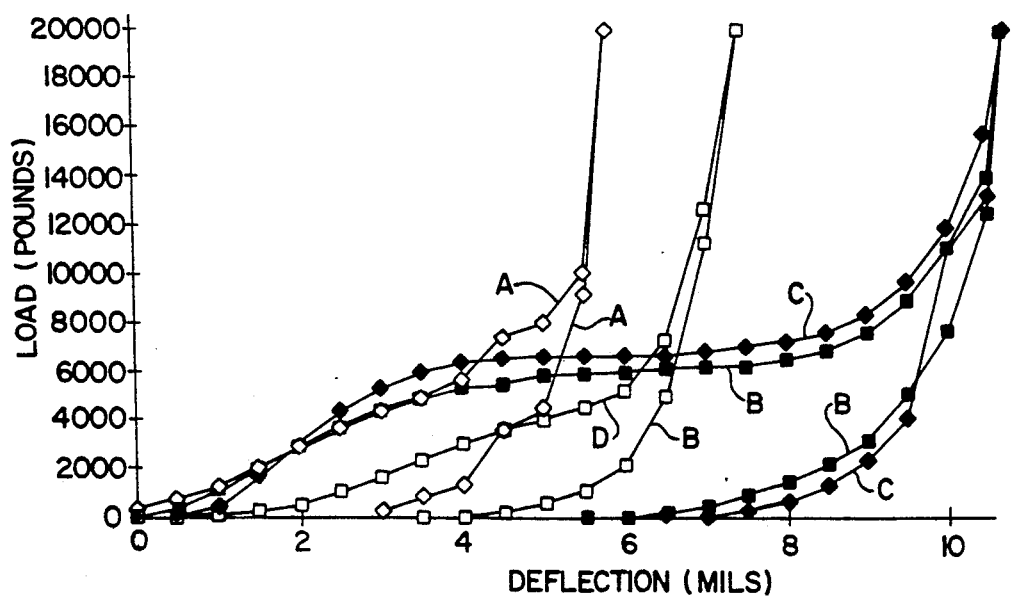
FIG. 4 is a graph comparing load deflection characteristics of gaskets of the present invention to those of the prior art.

Referring now to FIG. 4, this shows a comparison of load versus deflection of the several specimens illustrated as having been tested, and demonstrates the substantial improvement in the load deflection characteristics of the compound bead configuration, as compared to the prior art single beads.

Thus, those curves show that both the polyphenylene sulfide and polyether sulfone compound beads (Curves B and C) have higher recoveries than the respective prior art beads (Curves A and D) and show, as well, that between 4 mils and 8 mils deflection, the compound bead over bead design has a flat curve section which demonstrates better conformability, and that cracking in the gasket body itself is less likely to occur.

As such, the compound bead provides for the conformability necessary at the torque-up stage and the stiffness required to eliminate creep relaxation at elevated temperatures.

Although filled thermoplastic resins which tend to have amorphous characteristics are preferred, with the compound bead construction as described herein, other thermoplastic resins may be considered for use as well depending upon temperature, loading and other anticipated service conditions Thus, thermoplastic resin materials such as nylon, polypropylene, polyphthalamide, such as Amodel, a tradename of Amoco, polyphenylene sulfide and polyether sulfone, some of which may exhibit properties which tend to be more cystalline than amorphous, may be used, in some cases unfilled instead of filled with at least three percent fibers as described above.

It will be apparent to those skilled in the art from the foregoing that modifications may be made without departing from the spirit of the present invention. Accordingly, the invention is not intended to be limited, except as may be dictated by the appended claims.

What is claimed is:

1. A gasket comprising a thin main gasket body having expansive main surfaces defining a plurality of openings including at least one service opening, said gasket body being molded of a thermoplastic resin, said gasket body as molded having integrally formed, vertically aligned, oppositely directed compound sealing beads of solid cross-section projecting outwardly from each of the said main surfaces of the gasket body and surrounding at least one service opening, each said compound sealing bead comprising a first bead element formed with said gasket body, said first bead element extending outwardly from a main surface of said gasket body, and having a first cross-sectional width where it merges with said main surface, and a second bead element having its base integral with said first bead element and extending outwardly from said first bead element, said second bead element having a second cross-sectional width where it merges with said first bead element, said width being substantially less than said first cross-sectional width.

2. The gasket in accordance with claim 1, and wherein said first cross-sectional width is at least twice said second cross-sectional width.

3. The gasket in accordance with claim 1, and wherein there is not recess in said main surface adjacent said first bead element.

4. The gasket in accordance with claim 1, and wherein said gasket body is molded of a reinforced thermoplastic resin, said resin being filled and reinforced with fibers in an amount of at least three percent by weight of the unfilled resin.

5. The gasket in accordance with claim 4, and wherein said thermoplastic resin is one of a polyether sulfone and polyphenylene sulfide.

6. The gasket in accordance with claim 4 and wherein said gasket is a head gasket defining at least two combustion openings and armors disposed at the peripheries of said combustion openings.

7. The gasket in accordance with claim 1 and wherein said first and second bead elements are generally trapezoidal in cross-section.

8. In a cylinder head gasket for an internal combustion engine having a head, a block, at least one combustion chamber and at least one passage for fluid communication between the head and the block, the cylinder head gasket comprising:

an integrally molded thin main gasket body having expansive main surfaces and defining a plurality of openings including at least one combustion opening and at least one opening for fluid communication between the head and the block of an internal combustion engine, said main gasket body being molded of a reinforced thermoplastic resin composite, said thermoplastic resin, in an unfilled state, having a high heat distortion temperature of at least 347° F. at 264 psi (according to ASTM Test D648), and being essentially inert to water, and to automotive fuels, coolants and oils, said resin having an aromatic backbone, having a flexural modulus of at least about 250,000 psi and a relatively high elongation to promote sealing, said resin being filled and reinforced with fibers in an amount of at least 3% by weight of the unfilled resin, said fibers having a higher stiffness and strength than said unfilled resin and being deformable in tension, compression and bending under transverse loading without fracturing, said fibers having a tensile modulus of not less than $10 \times 10^6$ psi at 500° F., said fibers serving to distribute loads to which the gasket is subjected in use between the fibers and the resin, having good bonding to the resin, and having a higher modulus and strength than said unfilled resin to sustain a larger proportion of load, and thereby to provide high sealing stress retention and to prevent torque loss in use by reducing the stress relaxation of the unreinforced resin, said fibers being random in orientation and short in length and having an aspect ratio of at least 20, and wherein said gasket body as molded has integrally formed, vertically aligned, oppositely directed compound sealing beads of solid cross-section projecting outwardly from each of the main surfaces of the gasket body and surrounding at least one of said openings, each said compound sealing bead comprising a first bead element formed with said gasket body, said first bead element extending outwardly from a main surface of said gasket body, and having a first cross-sectional width where it merges with said main surface, and a second bead element having its base integral with said first bead element and extending outwardly from said first bead element, said second bead element having a second cross-sectional width where it merges with said first bead element, said width being substantially less than said first cross-sectional width.

9. The cylinder head gasket in accordance with claim 8, and wherein said thermoplastic resin is substantially amorphous.

10. The head gasket in accordance with claim 8, and wherein said first cross-sectional width is at least twice said second cross-sectional width.

11. The head gasket in accordance with claim 8, and wherein there is no recess in said main surface adjacent said first bead element.

12. The head gasket in accordance with claim 8, and wherein said first and second bead elements are generally trapezoidal in cross-section.

* * * * *